(No Model.)
2 Sheets—Sheet 1.
J. FISHERO.
Flour and Meal Chest.
No. 234,013.    Patented Nov. 2, 1880.
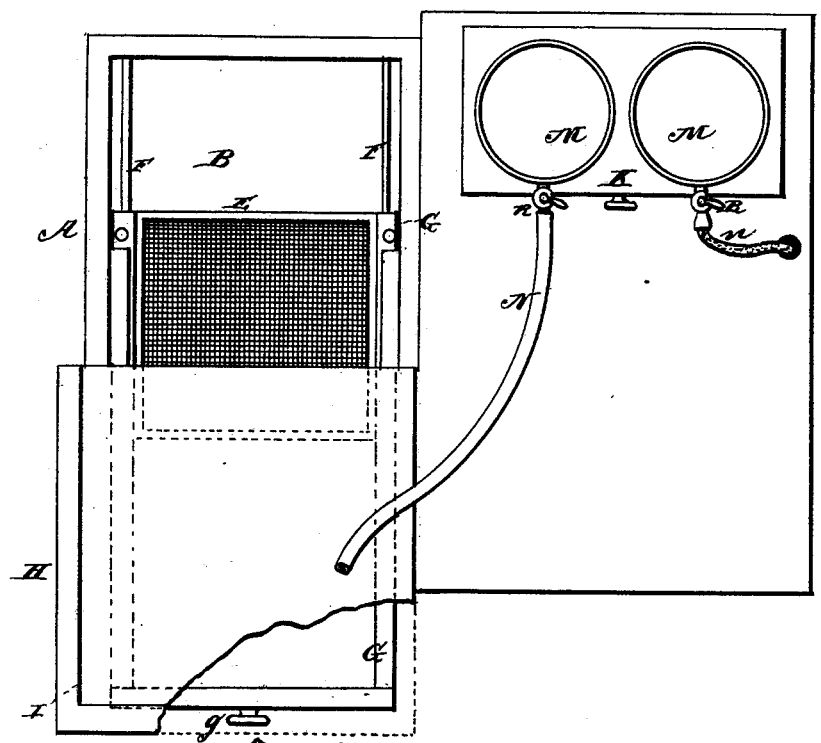
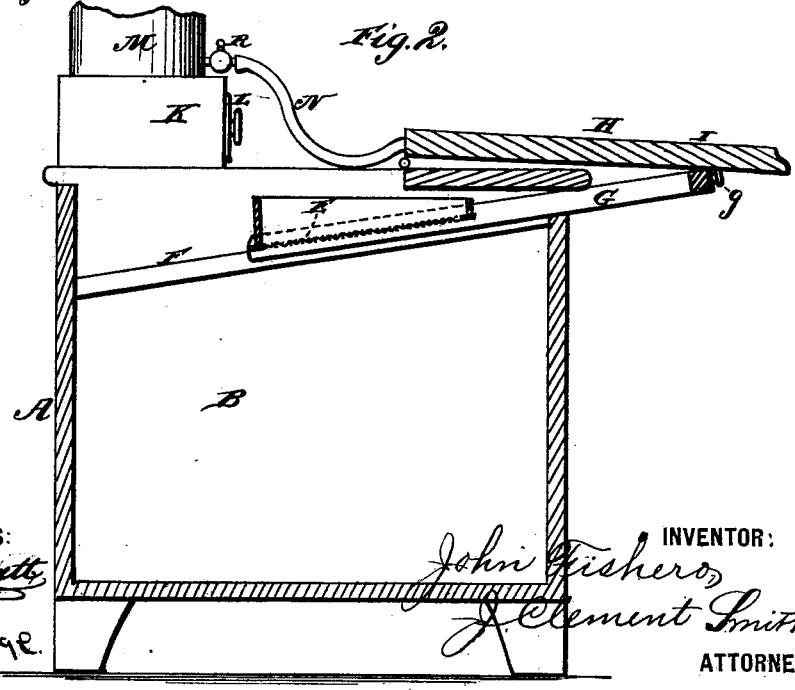

(No Model.)
2 Sheets—Sheet 2.
J. FISHERO.
Flour and Meal Chest.
No. 234,013. Patented Nov. 2, 1880.
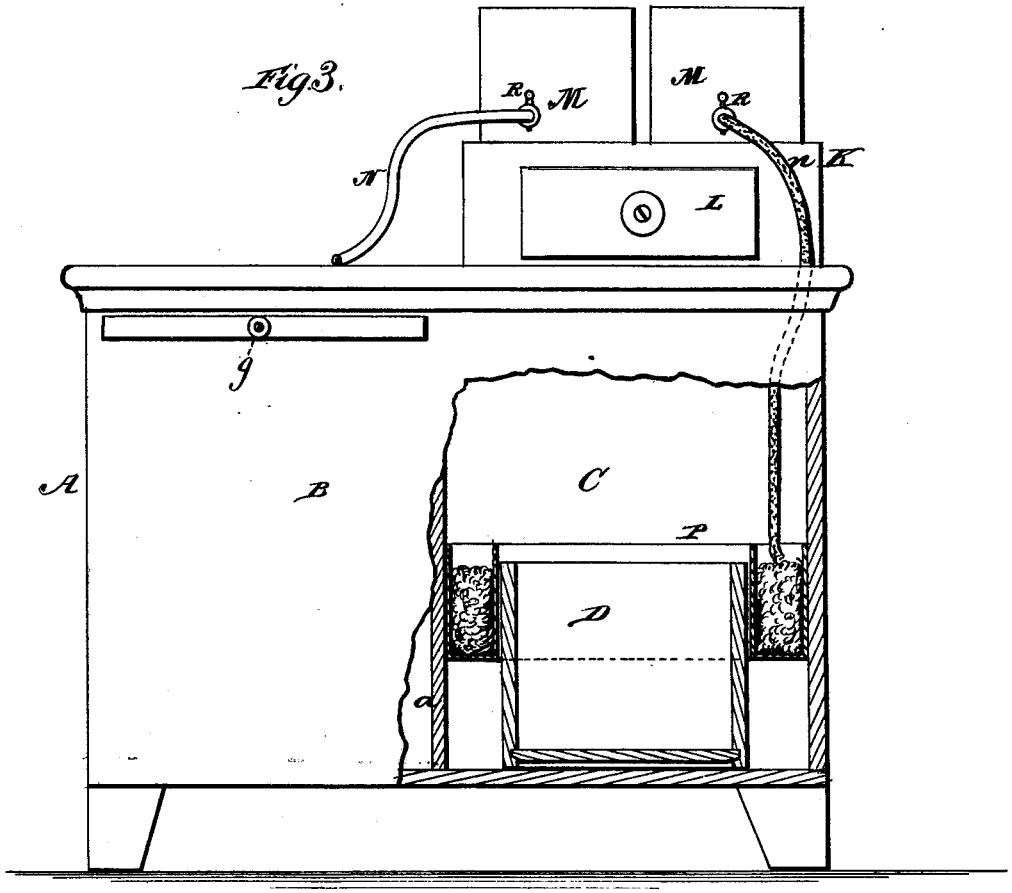

ns to lity.# UNITED STATES PATENT OFFICE.

JOHN FISHERO, OF ALAMO, INDIANA.

FLOUR AND MEAL CHEST.

SPECIFICATION forming part of Letters Patent No. 234,013, dated November 2, 1880.

Application filed June 29, 1880. (No model.)

*To all whom it may concern:*

Be it known that I, JOHN FISHERO, of Alamo, in the county of Montgomery and State of Indiana, have invented certain new and useful Improvements in a Flour and Meal Chest; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a plan of my flour and meal chest with the cover or kneading-board raised back. Fig. 2 is a transverse sectional view of the same; and Fig. 3 is a front view, partly in section.

This invention relates to flour or meal and bread chests; and it consists in the improved features of construction and combination hereinafter fully described, and particularly pointed out in the claims.

In the drawings, A designates the chest, which is divided into two compartments by a central partition, a. The compartment B is designed to receive either flour or meal, and the compartment C to receive a sliding drawer, D, into which bread is to be placed.

The flour or meal is sifted through a sieve, E, which has side bars, G, arranged to slide upon cleats F, secured to the chest and to the central partition. These side bars are extended so as to form supports for a kneading-board when they are drawn out from the chest, as shown in Figs. 1 and 2. Said bars are connected at their outer ends by a cross-bar, to which is secured a handle, g, whereby the bars and sieve may be operated for the purpose of sifting flour or extending the bars.

H designates a hinged cover which closes the flour-compartment. It is provided with flanges I along two of its sides, and when raised and thrown back, as shown in Figs. 1 and 2, it constitutes a kneading-board.

K is a small box upon the chest, and this box receives a small drawer, L, which may be utilized to receive spices or other articles. Upon the box K are mounted two water-tanks, M, from one of which a pipe, N, leads to a sufficient distance to supply water to the kneading-board. From the remaining water-tank a wick, n, of cotton terry leads down to a trough, P, which is arranged at the sides and back of the bread-drawer. This trough is filled with cotton terry or sponge, which will be dampened by the water drawn down the wick, thus dampening the atmosphere around the bread and keeping the bread from becoming too dry.

Stop-cocks R R are provided for shutting off the supply of water from either the pipe or the wick.

The flour and bread chest thus constructed constitutes a convenient, efficient, and novel device.

If desired, the wick which leads from one of the water-tanks to the trough around the bread-drawer may be formed of cotton terry surrounding a wire coil and passed at its upper end into the top of the tank. The wire will serve to keep the wick in place at all times.

What I claim is—

1. In a flour and bread chest, the combination of the hinged cover H with the sieve having bars G arranged to be extended out from the chest so as to support the hinged cover H, substantially as specified.

2. The flour and bread chest A, provided with water-tanks M and a kneading-board, one of said tanks having a pipe leading to the kneading-board, and the remaining tank a wick leading to the compartment containing the bread-drawer, substantially as set forth.

3. In a flour and meal chest, the compartment C, containing a bread-drawer, and a trough, P, containing some absorbent material, said chest being also provided with a water-tank from which a wick, n, is extended down to the trough P, substantially as set forth.

In testimony that I claim the above I have hereunto subscribed my name in the presence of two witnesses.

JOHN FISHERO.

Witnesses:
WILLIAM LAMN,
JOSEPH G. GRIMES.